United States Patent
Ito et al.

(10) Patent No.: US 7,527,091 B2
(45) Date of Patent: May 5, 2009

(54) VEHICULAR AIR CONDITIONER

(75) Inventors: Koji Ito, Nagoya (JP); Tomohide Shindo, Kariya (JP)

(73) Assignee: Denso Corporation, Kariya (JP)

( * ) Notice: Subject to any disclaimer, the term of this patent is extended or adjusted under 35 U.S.C. 154(b) by 713 days.

(21) Appl. No.: 10/999,289

(22) Filed: Nov. 29, 2004

(65) Prior Publication Data

US 2005/0115704 A1    Jun. 2, 2005

(30) Foreign Application Priority Data

Dec. 2, 2003    (JP)    ............................. 2003-402909

(51) Int. Cl.
*B60H 1/00*    (2006.01)
*F25B 29/00*    (2006.01)

(52) U.S. Cl. ........................... 165/202; 165/42; 165/43; 165/140; 165/240; 165/237; 62/199; 62/200; 62/186; 62/244; 237/12.3 A; 237/12.3 B

(58) Field of Classification Search ................. 165/202, 165/240, 140, 42, 43, 237; 62/199, 200, 62/238.6, 238.7, 239, 186, 244; 237/12.3 A, 237/12.3 B, 2 A, 2 B See application file for complete search history.

(56) References Cited

U.S. PATENT DOCUMENTS

| | | | | |
|---|---|---|---|---|
| 2,205,117 | A * | 6/1940 | Chambers | ................... 165/101 |
| 6,431,257 | B1 | 8/2002 | Sano et al. | |
| 6,449,974 | B1 | 9/2002 | Kampf | |
| 6,810,952 | B2 * | 11/2004 | Ben Fredj et al. | ........... 165/202 |
| 6,986,387 | B2 * | 1/2006 | Hancock | ..................... 165/103 |

2002/0035843 A1    3/2002    Kampf

FOREIGN PATENT DOCUMENTS

| | | |
|---|---|---|
| JP | 55-094810 | 7/1980 |
| JP | 60-015217 | 1/1985 |
| JP | 06-156048 | 6/1994 |
| JP | 08310222 A * | 11/1996 |
| JP | 10-067224 | 3/1998 |
| JP | 2002-331819 | 11/2002 |
| JP | 2003127633 A * | 5/2003 |

OTHER PUBLICATIONS

Office action dated Oct. 7, 2008 in Japanese Application No. 2003-402909 with English translation thereof.
Notice of Reasons for Refusal issued on Feb. 19, 2008 in the corresponding JP patent application No. 2003-402909.

* cited by examiner

*Primary Examiner*—John K Ford
(74) *Attorney, Agent, or Firm*—Harness, Dickey & Pierce, PLC

(57) ABSTRACT

In a vehicle air conditioner, a cooling heat exchanger for cooling air is arranged in the air conditioning case, and a cooling/heating switching heat exchanger is arranged at a downstream air side of the cooling heat exchanger in the air conditioning case. A first bypass passage is provided at one side of the cooling heat exchanger in the air conditioning case, so that air flows through the first bypass passage while bypassing the cooling heat exchanger. A second bypass passage is provided at one side of the cooling/heating switching heat exchanger in the air conditioning case on an opposite side of the first bypass passage with respect to the first heat exchanger, so that air flows through the second bypass passage while bypassing the cooling/heating switching heat exchanger. Accordingly, a size of the air conditioner can be effectively decreased while a maximum cooling capacity can be sufficiently obtained.

15 Claims, 6 Drawing Sheets

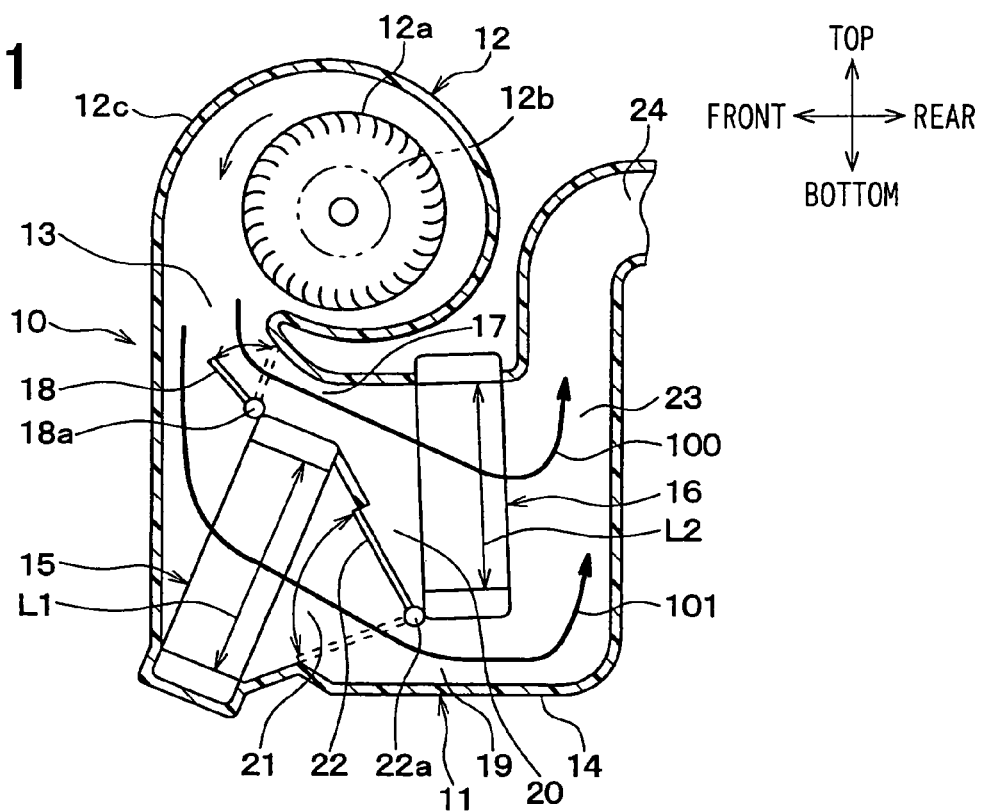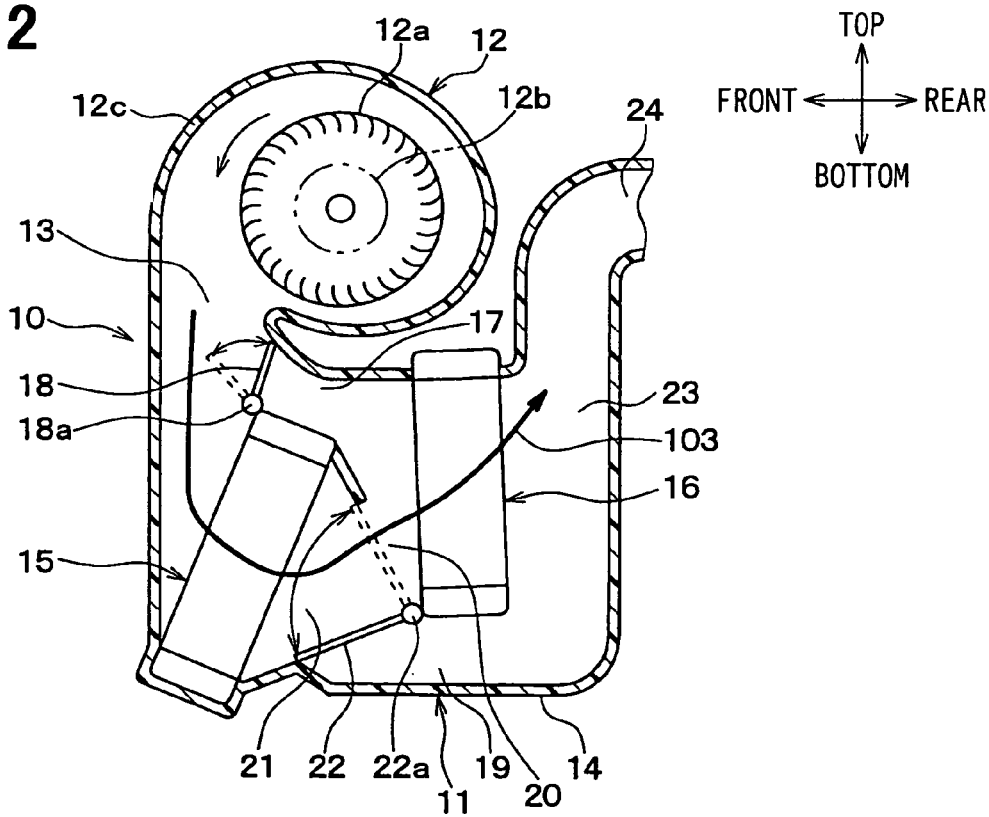

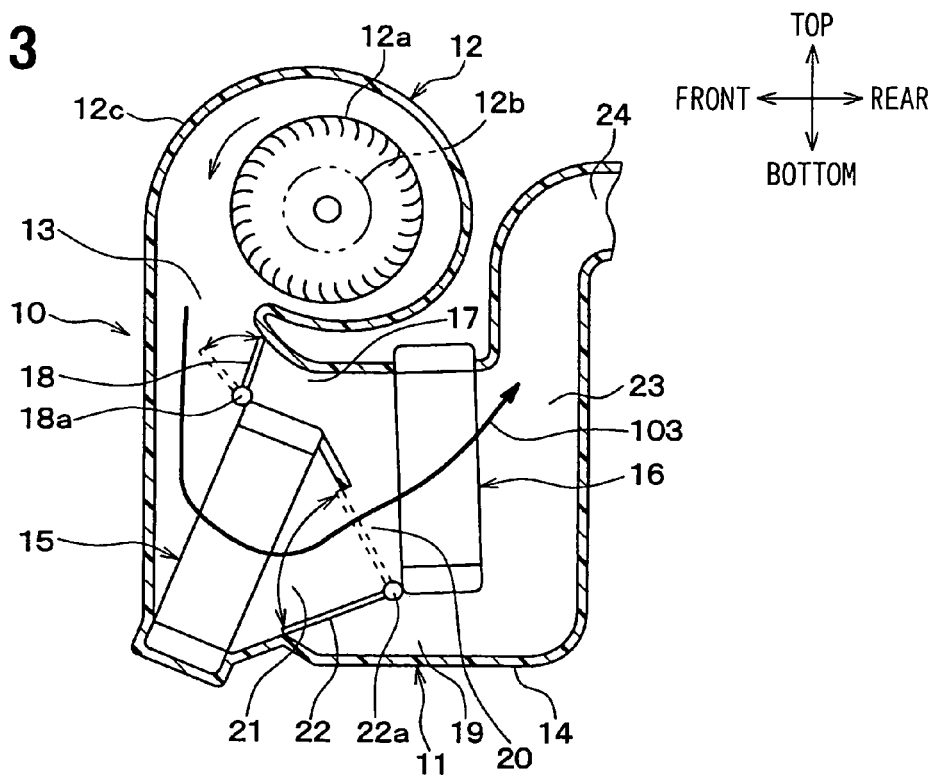
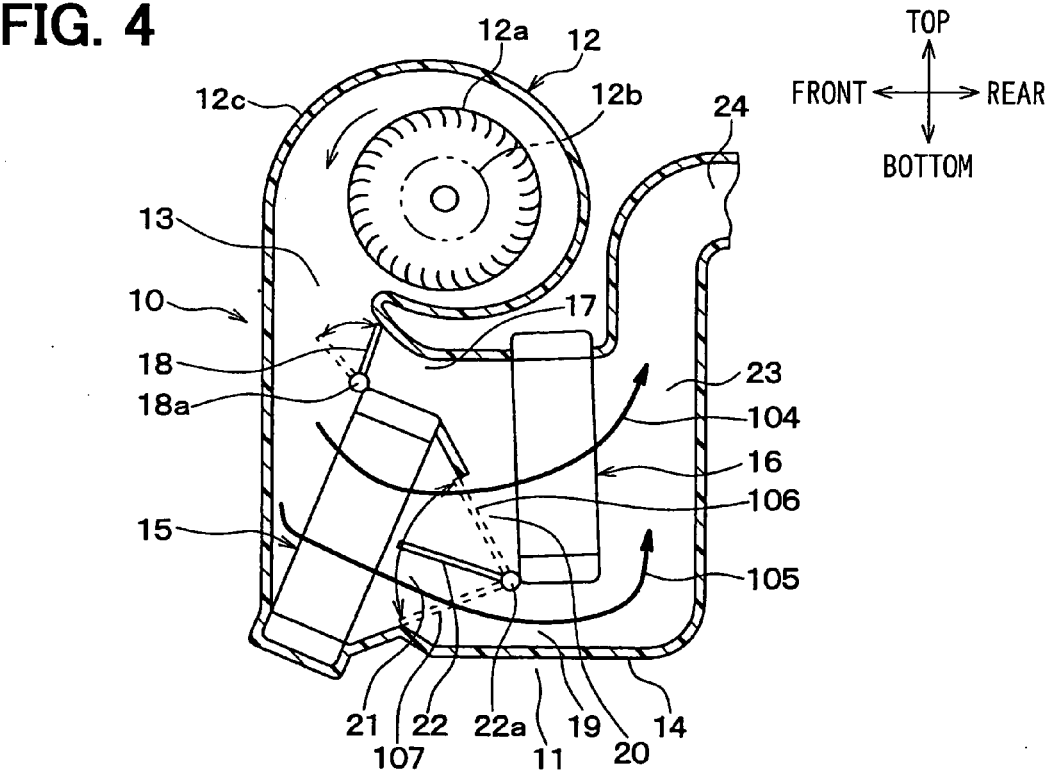

VEHICULAR AIR CONDITIONER

CROSS REFERENCE TO RELATED APPLICATION

This application is based on Japanese Patent Application No. 2003-402909 filed on Dec. 2, 2003, the disclosure of which is incorporated herein by reference.

FIELD OF THE INVENTION

The present invention relates to a vehicle air conditioner in which a size of an interior air-conditioning unit can be effectively reduced.

BACKGROUND OF THE INVENTION

In a vehicle air conditioner described in U.S. Pat. No. 6,431,257 (corresponding to JP-A-2001-105830), a heating heat exchanger, a cool air bypass passage and an air mixing door are suitably arranged with respect to a cooling heat exchanger constructed of an evaporator of a refrigerant cycle, so that a size of an interior air-conditioning unit is reduced. However, in this vehicle air conditioner, a maximum cooling capacity to be necessary is obtained only using the single cooling heat exchanger. Accordingly, the size of the cooling heat exchanger necessarily becomes larger when, the maximum cooling capacity is set larger. Therefore, it is difficult to reduce the size of the interior air-conditioning unit.

Furthermore, in a vehicle air conditioner described in U.S. Pat. No. 6,449,974 (corresponding to JP-A-2002-46448), an auxiliary heat exchanger is arranged at a downstream air side of a cooling heat exchanger constructed of an evaporator of a refrigerant cycle. The auxiliary heat exchanger is capable of switching between a heating function and a cooling function. In addition, a heating heat exchanger in which hot water (engine-cooling water) flows is arranged at a downstream air side of the auxiliary heat exchanger.

In this vehicle air conditioner described in U.S. Pat. No. 6,449,974, when a maximum cooling operation is set, the auxiliary heat exchanger is arranged in series with the cooling heat exchanger in a low-pressure side of the refrigerant cycle so that both the cooling heat exchanger and the auxiliary heat exchanger are used as evaporators. However, in this case, because the three heat exchangers are used in the interior air-conditioning unit, arrangement spaces of the three heat exchangers becomes large, and thereby increasing the size of the interior air-conditioning unit.

SUMMARY OF THE INVENTION

In view of the above-described problems, it is an object of the present invention to provide a vehicle air conditioner in which a size of an interior air-conditioning unit can be effectively reduced while a maximum cooling capacity can be sufficiently obtained.

According to an aspect of the present invention, an air conditioner for a vehicle includes an air conditioning case in which air flows toward a passenger compartment, a first heat exchanger for cooling air disposed in the air conditioning case to define a first bypass passage through which air flows while bypassing the first heat exchanger at one side of the first heat exchanger in the air conditioning case, a first switching member for opening and closing the first bypass passage, a second heat exchanger disposed at a downstream air side of the first heat exchanger in the air conditioning case to define a second bypass passage through which air flows in the air conditioning case while bypassing the second heat exchanger at the other end side relative to the first heat exchanger, and a second switching member for opening and closing the second bypass passage. In the air conditioner, the second heat exchanger is switched to have a cooling function for cooling air or a heating function for heating air. Accordingly, in a maximum cooling mode for cooling the passenger compartment in maximum, the second heat exchanger is operated to have the cooling function, so that a necessary maximum cooling capacity can be readily obtained by a total cooling capacity of both the first and second heat exchangers without increasing the size of the first heat exchanger. Therefore, a size of an interior air-conditioning unit of the vehicle air conditioner can be effectively decreased while cooling capacity can be improved.

Preferably, the first and second heat exchangers are arranged to set a first maximum cooling mode in which a maximum cooling operation is performed to have an air amount priority while air flows through the first and second heat exchangers in parallel. Furthermore, in the first maximum cooling mode, the second heat exchanger is switched to have the cooling function for cooling air, the first switching member opens the first bypass passage, and the second switching member opens the second bypass passage. Accordingly, in the first maximum cooling mode, an air-flowing pressure loss can be effectively reduced, and air-blowing noise can be also effectively reduced.

Alternatively, the first and second heat exchangers are arranged to set a second maximum cooling mode in which a maximum cooling operation is performed to have an air temperature priority while air flows through the first and second heat exchangers in series. Furthermore, in the second maximum cooling mode, the second heat exchanger is switched to have the cooling function for cooling air, the first switching member closes the first bypass passage, and the second switching member closes the second bypass passage. Accordingly, in the second maximum cooling mode, the temperature of air to be blown into the passenger compartment can be effectively reduced.

Further, in a maximum heating mode for heating the passenger compartment in maximum, the second heat exchanger is switched to have the heating function for heating air, and the second switching member closes the second bypass passage. Therefore, the maximum heating capacity can be effectively improved.

More preferably, the first heat exchanger and the second heat exchanger communicate with each other through a communication passage. Further, when the first switching member fully opens the first bypass passage, air flows through both the first heat exchanger and the first bypass passage by a predetermined ratio. In contrast, when the second switching member fully opens the second bypass passage, the communication passage is closed by the second switching member.

In addition, in a temperature control mode where a temperature of air to be blown into the passenger compartment is adjusted, the second heat exchanger is switched to have the heating function for heating air, and the second switching member adjusts a ratio between an air amount flowing through the second bypass passage and an air amount flowing through the second heat exchanger to control the temperature of air to be blown into the passenger compartment. Alternatively, the second switching member closes the communication passage, and the first switching member adjusts a ratio between an air amount flowing through the first bypass passage and an air amount flowing through the first heat exchanger to control the temperature of air to be blown into the passenger compartment.

More preferably, the second heat exchanger has the cooling function by introducing a low temperature medium from a low temperature medium circuit into the second heat exchanger, and the second heat exchanger has the heating function by introducing a high temperature medium from a high temperature medium circuit into the second heat exchanger.

The vehicle air conditioner can be provided with a determining unit for determining whether there is a rear seat passenger in the passenger compartment. When the determining unit determines there is the rear seat passenger in the passenger compartment, the first maximum cooling mode is set as the maximum cooling operation.

According to another aspect of the present invention, a first heat exchanger is disposed at an upstream air side in an air conditioning case for cooling air, a second heat exchanger having at least a cooling function is disposed at a downstream air side of the first heat exchanger in the air conditioning case, and air flow switching means is disposed in the air conditioning case for switching an air flow in each of the first and the second heat exchangers. In the vehicle air conditioner, when a first maximum cooling mode where a maximum cooling operation is performed to have an air amount priority is set, the second heat exchanger has the cooling function, and the air flow switching means switches the air flows of the first and the second heat exchangers such that air flows through the first and the second heat exchangers in parallel. Accordingly, the cooling capacity can be sufficiently improved while the size of the first heat exchanger can be reduced.

Furthermore, when a second maximum cooling mode where a maximum cooling operation is performed to have a low temperature priority is set, the second heat exchanger has the cooling function, and the air flow switching means switches the air flows of the first and the second heat exchangers such that air flows through the first and the second heat exchangers in series. In this case, the air temperature to be blown into the passenger compartment can be sufficiently reduced.

For example, the air flow switching means includes a first bypass passage through which air flows while bypassing the first heat exchanger, a first switching member for opening and closing the first bypass passage, a second bypass passage through which air flows while bypassing the second heat exchanger, and a second switching member for opening and closing the second bypass passage. Generally, the first bypass passage is provided at one side of the first heat exchanger in the air conditioning case, and the second bypass passage is provided in the air conditioning case at one side of the second heat exchanger to be opposite to the first bypass passage with respect to the first heat exchanger. Furthermore, when the first maximum cooling mode is set, the first switching member opens the first bypass passage and the second switching member opens the second bypass passage. In contrast, when the second maximum cooling mode is set, the first switching member closes the first bypass passage and the second switching member closes the second bypass passage. Accordingly, any one of the first and second maximum cooling modes can be readily set.

BRIEF DESCRIPTION OF THE DRAWINGS

Other objects, features and advantages of the present invention will become more apparent from the following detailed description made with reference to the accompanying drawings, in which:

FIG. 1 is a schematic sectional view of an interior air-conditioning unit for a vehicle air conditioner in a first maximum cooling mode where a maximum cooling operation is performed to have an air amount priority, according to a first embodiment of the present invention;

FIG. 2 is a schematic sectional view of the interior air-conditioning unit in a second maximum cooling mode where a maximum cooling operation is performed to have a low temperature priority, according to the first embodiment;

FIG. 3 is a schematic sectional view of the interior air-conditioning unit in a maximum heating mode according to the first embodiment;

FIG. 4 is a schematic sectional view of the interior air-conditioning unit in a temperature control mode according to the first embodiment;

DETAILED DESCRIPTION OF THE PREFERRED EMBODIMENTS

First Embodiment

Figure 5A:
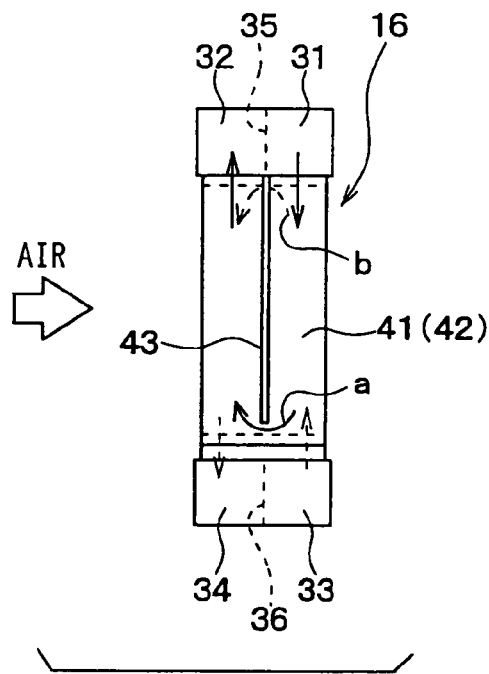
FIGS. 5A and 5B are a side view and a front view showing a cooling/heating switching heat exchanger according to the first embodiment.

The first embodiment of the present invention will be now described with reference to FIGS. 1-8. In the first embodiment, an interior air-conditioning unit 10 is mounted in a vehicle in an arrangement state shown in FIGS. 1-4.

The interior air-conditioning unit 10 includes an air-conditioning unit portion 11 having therein heat exchangers, and a blower portion 12 disposed at an upper side of the air-conditioning unit portion 11. The blower portion 12 is constructed with a centrifugal fan 12a, an electrical motor 12b for driving the centrifugal fan 12a, and a scroll casing 12c for accommodating the centrifugal fan 12.

A suction port (not shown) of the centrifugal fan 12a is formed on a side wall of the scroll casing 12c in a vehicle right-left direction (face-back direction of paper in FIGS. 1-4), and an inside/outside air switching box (not shown) is provided to be connected to the suction port. The inside/outside air switching box has an outside air introduction port for introducing air (outside air) outside a passenger compartment, and an inside air introduction port for introducing air (inside air) inside the passenger compartment. An inside/outside air switching door is disposed to open and close the outside air introduction port and the inside air introduction port. The inside/outside air switching door is driven by an inside/outside air switching mechanism having a servomotor 74.

The scroll casing 12c has an outlet passage 13 through which air blown by the centrifugal fan 12a flows downwardly from an upper side. The air-conditioning unit portion 11 includes an air conditioning case 14 for forming an air passage through which air flows from a vehicle front side to a vehicle rear side. The outlet passage 13 of the scroll casing 12c communicates with the air conditioning case 14 at an upper portion on the vehicle frontmost side of the air conditioning case 14. Generally, the air conditioning case 14 is made of resin.

A cooling heat exchanger 15 (first heat exchanger) is disposed in the air conditioning case 14 at an upstream air side (vehicle front side), and a cooling/heating switching heat exchanger 16 (second heat exchanger) is disposed in the air conditioning case 14 at a downstream air side (vehicle rear side) with respect to the cooling heat exchanger 15.

In this embodiment, a first bypass passage 17 is formed in the air conditioning case 14 at a vehicle upper side. The first bypass passage 17 is disposed at one side of the cooling heat exchanger 15, so that air blown by the blower portion 12 flows through the first bypass passage 17 to bypass the cooling heat exchanger 15. Furthermore, the first bypass passage 17 is arranged so that air having passed through the first bypass passage 17 flows into the cooling/heating switching heat exchanger 16. The first bypass passage 17 is opened and closed by a first bypass door 18.

When the first bypass door 18 is operated to the chain line position in FIG. 1, the first bypass door 18 fully closes the first bypass passage 17. In this case, an upstream passage of the cooling heat exchanger 15 is fully opened. In contrast, when the first bypass door 18 is operated to the solid line position in FIG. 1, the first bypass passage 17 is fully opened. Even when the first bypass door 18 fully opens the first bypass passage 17, the upstream passage of the cooling heat exchanger 15 is opened. For example, when the first bypass door 18 fully opens the first bypass passage 17, the upstream passage of the cooling heat exchanger 15 is opened by about 50%.

Furthermore, a second bypass passage 19 is formed downstream of the cooling heat exchanger in the air conditioning case 14 at a vehicle lower side, that is, at an opposite side of the cooling heat exchanger 15 with respect to the first bypass passage 17. Moreover, the second bypass passage 19 is arranged at one side of the cooling/heating switching heat exchanger 16, so that air flows through the second bypass passage 19 while bypassing the cooling/heating switching heat exchanger 16.

Further, a communication passage 20 is formed in the air conditioning case 14 between the first bypass passage 17 on the vehicle upper side of the cooling heat exchanger and the second bypass passage 19 on the vehicle lower side of the cooling/heating switching heat exchanger 16. Through the communication passage 20, a downstream passage 21 immediately after the cooling heat exchanger 15 communicates with an upstream passage of the cooling/heating switching heat exchanger 16. That is, the downstream passage 21 of the cooling heat exchanger 15 is provided to communicate with both the second bypass passage 19 and the communication passage 20.

A second bypass door 22 is arranged between the cooling heat exchanger 15 and the cooling/heating heat exchanger 16 to open and close the second bypass passage 19 and the communication passage 20. When the second bypass door 22 is operated to the solid line position in FIG. 1, the second bypass door 22 fully opens the second bypass passage 19 and fully closes the communication passage 20. In contrast, when the second bypass door 22 is operated to the chain line position in FIG. 1, the second bypass door 22 fully closes the second bypass passage 19 and fully opens the communication passage 20.

The first bypass door 18 is a plate door rotatable around a rotation shaft 18a, and the second bypass door 22 is a plate door rotatable around a rotation shaft 22a. One side ends of the rotation shafts 18a, 22a protrude outside of the air conditioning case 14, and respectively connect with door operation mechanisms which are independent from each other and respectively driven by servomotors 71, 72 shown in FIG. 7.

An air mixing portion 23 is formed at a downstream air side of the cooling/heating switching heat exchanger 16. A downstream passage of the cooling/heating switching heat exchanger 16 and a downstream portion of the second bypass passage 19 communicate with each other at the air mixing portion 23. Therefore, air passing through the cooling/heating switching heat exchanger 16 and air passing through the second bypass passage 19 are mixed in the air mixing portion 23. The air mixing portion 23 is arranged at the vehicle rear side from the cooling/heating switching heat exchanger 16, so that air flows through the air mixing portion 23 form the vehicle lower side to the vehicle upper side.

An air blowing-out opening portion 24 through which air is blown into the passenger compartment is formed at a downstream air side (vehicle upper side) of the air mixing portion 23. The air blowing-out opening portion 24 is indicated as a singular opening to be readily illustrated, although the air blowing-out opening portion 24 is actually provided with plural openings as well known.

The air blowing-out opening portion 24 includes, for example, a defroster opening through which conditioned air is blown toward an inner surface of a front windshield, a face opening through which conditioned air is blown toward an upper side of a passenger in the passenger compartment, and a foot opening through which the conditioned air is blown toward a foot portion of the passenger in the passenger compartment. The plural openings of the air blowing-out opening portion 24 are opened and closed by an air outlet mode door (not shown). The air outlet mode door is operated by an air outlet mode operation mechanism having a driving servomotor 73 shown in FIG. 7.

Next, structures of the heat exchangers 15, 16 will be now described. The cooling heat exchanger 15 is an evaporator provided at a low pressure side of a refrigerant cycle 50 shown in FIG. 6. The cooling heat exchanger 15 includes multiple flat tubes in which a low-pressure refrigerant flows, multiple fines (e.g., corrugated fins) bonded to the tubes to enlarge a heat conduction area of an air side, a tank member for distributing the refrigerant into the multiple flat tubes and for collecting the refrigerant from the multiple flat tubes. In the cooling heat exchanger 15, the low pressure refrigerant flowing through the flat tubes is evaporated by absorbing heat from air passing therethrough, so that air passing through the cooling heat exchanger 15 in the air conditioning case 14 is cooled.

Figure 5B:
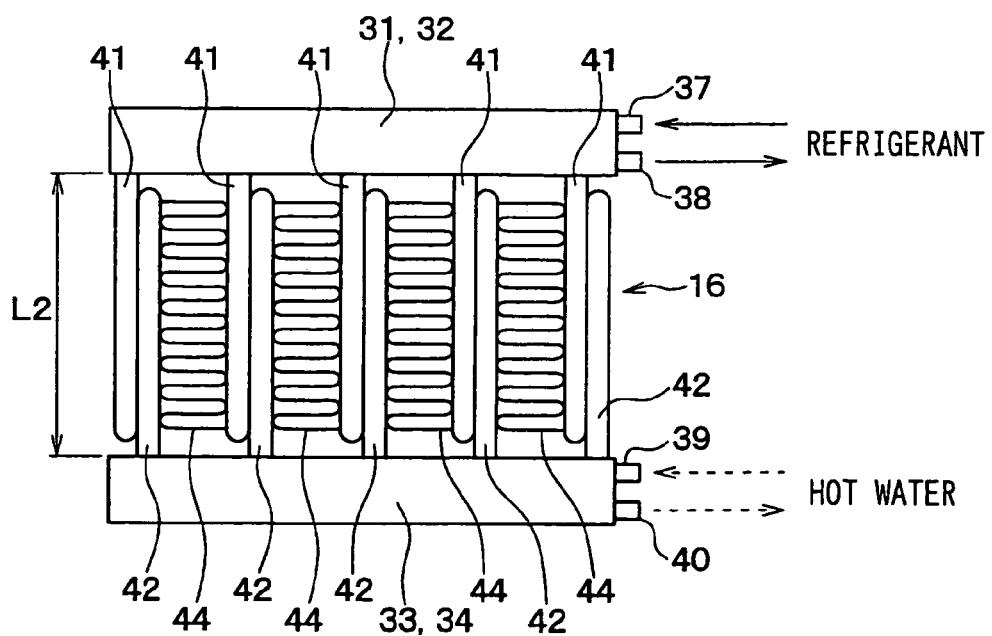

FIG. 5A and FIG. 5B show the specific structure of the cooling/heating switching heat exchanger 16. The heat exchanger 16 includes refrigerant tank portions 31, 32 arranged at one end side (e.g., vehicle upper side) of the heat exchanger 16, and hot water tank portions 33, 34 arranged at the other end side (e.g., vehicle lower side) of the heat exchanger 16. The refrigerant tank portions 31, 32 are partitioned from each other by a partition plate 35 to be arranged downstream and upstream in the air flowing direction. Similarly, the hot water tank portions 33, 34 are partitioned from each other by a partition plate 36 to be arranged downstream and upstream in the air flowing direction. Here, the tank portion 31 is a refrigerant inlet tank portion through which a low-pressure side refrigerant of the refrigerant cycle 50 is introduced into multiple refrigerant tubes 41, and the tank portion 32 is a refrigerant outlet tank portion to which the low-pressure refrigerant having passed through the refrigerant tubes 41 is collected. Further, the hot water tank portion 33 is a water inlet tank portion through which hot water from a vehicle engine is introduced into multiple water tubes 42, and the tank portion 34 is a water outlet tank portion to which the hot water having passed through the water tubes 42 is collected.

Specifically, the refrigerant inlet tank portion 31 and the water inlet tank portion 33 are arranged at a downstream air side in the heat exchanger 16, and the refrigerant outlet tank portion 32 and the water outlet tank portion 34 are arranged at an upstream air side in the heat exchanger 16. A refrigerant inlet 37, a refrigerant outlet 38, a water inlet 39 and a water outlet 40 are provided in the tank portions 31, 32, 33 and 34, respectively, at one end sides in a longitudinal direction (vehicle right-left direction) of the tank portions 31, 32, 33 and 34, as shown in FIG. 5B.

The refrigerant inlet tank portion 31 and the refrigerant outlet tank portion 32 communicate with each other through the refrigerant tubes 41. A passage partition portion 43 is provided in each of the refrigerant tubes 41, and is disposed at a center portion therein in the air flowing direction. Therefore, a refrigerant passage in each of the refrigerant tubes 41 is partitioned by the passage partition portion 43 into a front and a rear refrigerant passage portions in the air flowing direction, while a U-turn refrigerant passage portion is formed at a lower end portion in each refrigerant tube 41 as shown by the solid line arrow "a" in FIG. 5A. That is, each of the refrigerant tubes 41 has a U-turn refrigerant passage, through which the refrigerant in the refrigerant inlet tank portion 31 flows. The refrigerant from the refrigerant inlet tank portion 31 is uniformly distributed into the multiple refrigerant tubes 41.

Similarly, the water inlet tank portion 33 and the water outlet tank portion 34 communicate with each other through the water tubes 42. A passage partition portion 43 is provided in each of the water tubes 42, at a center portion therein in the air flowing direction. Therefore, a water passage in each of the water tubes 42 is partitioned by the passage partition portion 43 into a front and a rear water passage portions in the air flowing direction, while a U-turn water passage portion is formed at an upper end portion in each water tube 42 as shown by the chain line arrow "b" in FIG. 5A. That is, each of the water tubes 42 has a U-turn water passage, through which the hot water from the hot water inlet tank portion 33 flows. The refrigerant from the refrigerant inlet tank portion 31 is uniformly distributed into the multiple water tubes 42.

The multiple refrigerant tubes 41 and the multiple water tubes 42 are arranged in multiple pairs, each of which includes one refrigerant tube 41 and one water tube 42. Multiple corrugated fins 44 are provided in the heat exchanger 16, and each of the corrugated fins 44 is disposed between the two adjacent pairs of the tubes 41, 42. Each of the refrigerant tube 41 and the water tube 42 has a flat shape in which a sectional dimension in a direction (vehicle right-left direction) parallel to the longitudinal direction of the tanks 31, 32, 33, 34 is shorter than a sectional dimension in the air flowing direction. The refrigerant tubes 41 and the water tubes 42 are disposed so that two opposite surfaces of the refrigerant tube 41 and the water tube 42 in each pair directly contact each other. The other two surfaces of the refrigerant tube 41 and the water tube 42 in each pair contact the corrugated fins 44, respectively. The tubes 41, 42 and the corrugated fins 44 are thermally integrally bonded.

The above-described members 31-44 are made of a metal having a sufficient heat conduction capacity such as aluminum, and integrally boned by brazing to construct the cooling/heating switching heat exchanger 16.

In this embodiment, a height dimension L1 (shown in FIG. 1) of a heat-exchanging portion of the cooling heat exchanger 15 is set substantially equal to a height dimension L2 (shown in FIGS. 1 and 5) of a heat-exchanging portion of the cooling/heating switching heat exchanger 16. A cooling capacity of the cooling heat exchanger 15 is set substantially equal to that of the cooling/heating switching heat exchanger 16. Here, the heat-exchanging portions of the cooling heat exchanger 15 and the cooling/heating switching heat exchanger 16, which include the tubes and the fins as described above, are called as air passing portions through which air passes.

Next, the refrigerant cycle 50 and a hot water circuit 60 in this embodiment will be now described with reference to FIG. 6. The refrigerant cycle 50 includes a compressor 51 driven by a vehicle engine 61 in the hot water circuit 60, through an electromagnetic clutch 51a. A discharge side of the compressor 51 is connected to an inlet portion of a refrigerant receiver 53 through a condenser 52. The refrigerant in the condenser 52 is cooled by air (cooling air) blown by an electric cooling fan 52a.

An outlet portion of the refrigerant receiver 53 is connected to a thermal expansion valve 54 so that liquid refrigerant separated in the refrigerant receiver 53 is supplied to the thermal expansion valve 54. A downstream side of the thermal expansion valve 54 is connected to a refrigerant switching valve 55. The refrigerant switching valve 55 is switched to introduce a low pressure refrigerant having passed the thermal expansion valve 54 into the cooling/heating switching heat exchanger 16 or the cooling heat exchanger 15.

The refrigerant switching valve 55 is constructed with a three-way electromagnetic valve. A first outlet passage 55a of the refrigerant switching valve 55 is connected to the refrigerant inlet 37 of the cooling/heating switching heat exchanger 16. The refrigerant outlet 38 of the cooling/heating switching heat exchanger 16 is connected to a refrigerant inlet 57 of the cooling heat exchanger 15 through a communication pipe 56. Accordingly, when the first outlet passage 55a is opened by the refrigerant switching valve 55, the low pressure refrigerant having passed through the thermal expansion valve 54 firstly flows into the cooling/heating switching heat exchanger 16, and thereafter flows into the cooling heat exchanger 15. A refrigerant outlet 58 of the cooling heat exchanger 15 is connected to a suction side of the compressor 51 through a refrigerant suction pipe 59.

Moreover, a second outlet passage 55b of the refrigerant switching valve 55 is connected to the communication pipe 56 at a predetermined position. Accordingly, when the second outlet passage 55b is opened by the refrigerant switching valve 55, the low pressure refrigerant having passed through the thermal expansion valve 54 directly flows into the cooling heat exchanger 15 and bypasses the cooling/heating switching heat exchanger 16. Moreover, an opening degree of the thermal expansion valve 54 is adjusted so that a super-heating degree of refrigerant (refrigerant flowing into the suction pipe 59) at the refrigerant outlet 58 of the cooling heat exchanger 15 is maintained at a predetermined value.

Figure 6:
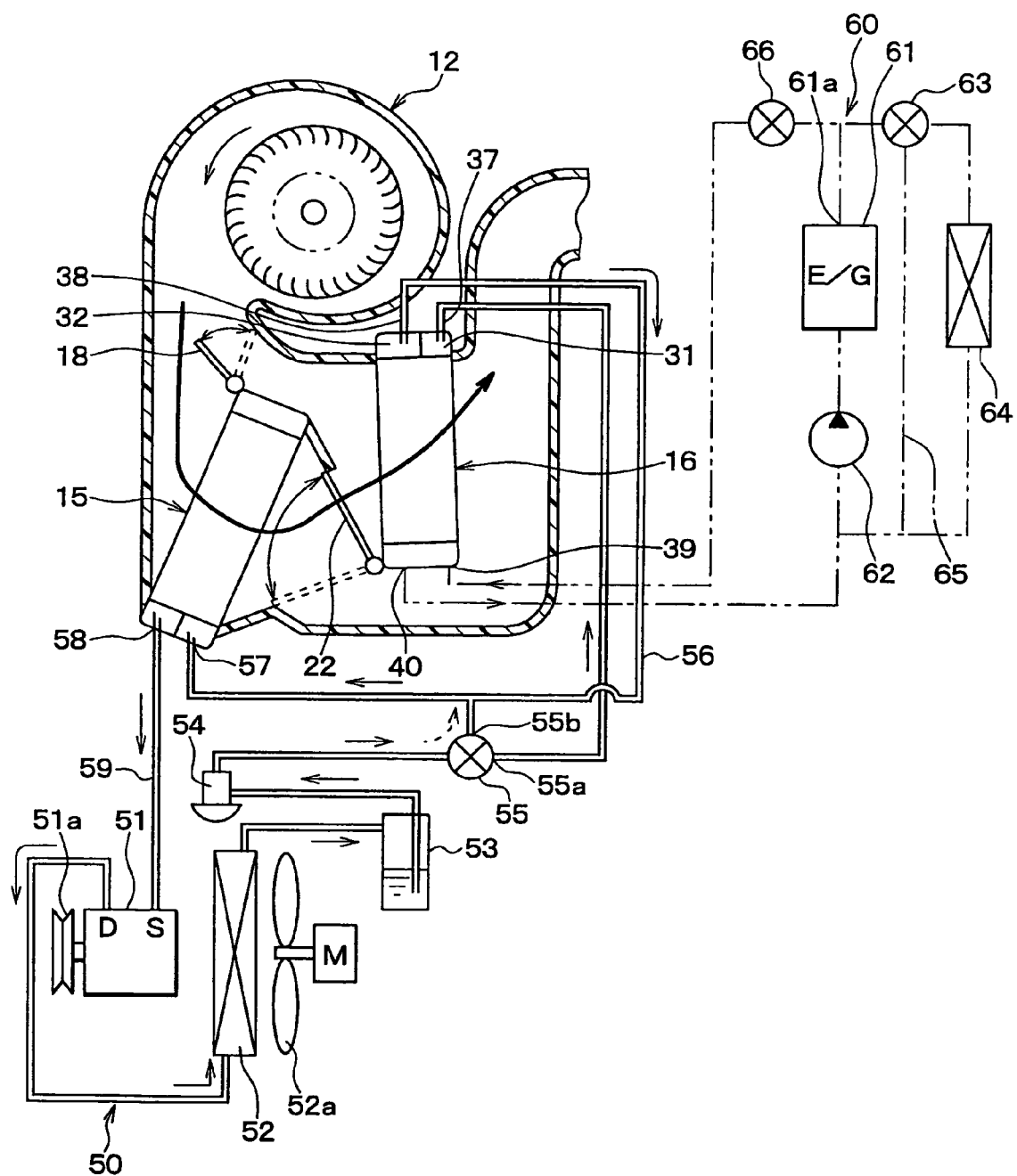
FIG. 6 is a schematic view showing a refrigerant cycle and a hot water circuit with respect to the interior air-conditioning unit according to the first embodiment.

In FIG. 6, the hot water circuit 60 is indicated by a two-point chain line. The vehicle engine 61 is provided with a mechanical water pump 62 driven by a rotating force of the vehicle engine 61. The water pump 62 pumps the hot water (engine-cooling water) so that the hot water circulates in a radiator 64 through a thermostat 63.

The thermostat 63 is a well-known thermal-responding valve. When the temperature of the hot water is smaller than a predetermined value, a water passage to the radiator 64 is closed, and the hot water flows through a water bypass passage 65. When the temperature of the hot water is equal to or larger than the predetermined value, the water passage to the radiator 64 is opened and the hot water flows through the radiator 64.

Moreover, a hot water outlet portion 61a of the vehicle engine 61 is connected to the water inlet 39 of the cooling/heating switching heat exchanger 16 through a hot water switching valve 66 constructed of an electromagnetic valve. The water outlet 40 of the cooling/heating switching heat exchanger 16 is connected to a suction side of the water pump 62.

Figure 7:
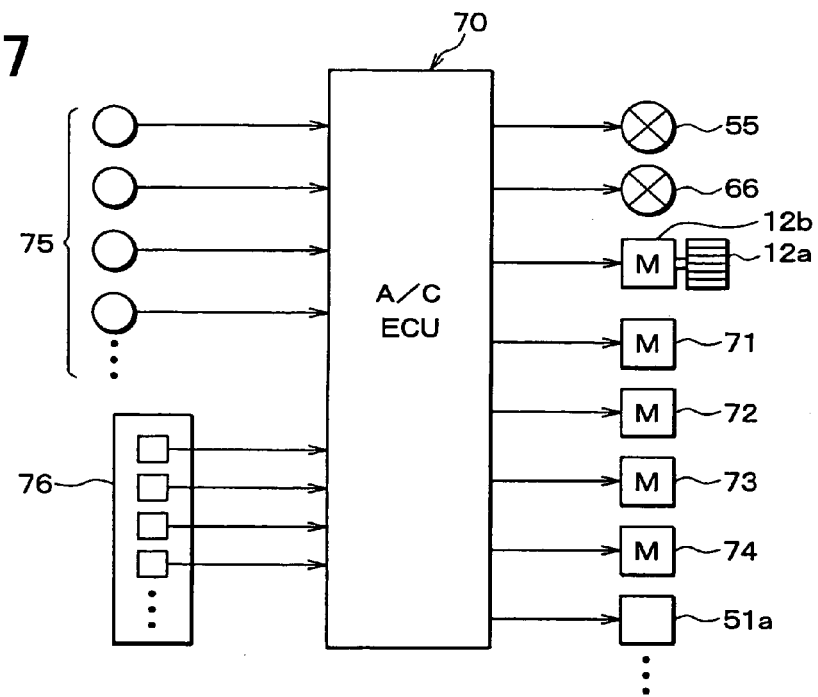
FIG. 7 is a block diagram of an electric control portion according to the first embodiment.

Next, an electric control operation in this embodiment will be now described with reference to FIG. 7. An air-conditioning electronic control unit 70 (A/C ECU) includes a microcomputer and circuits. According to a program stored in the microcomputer beforehand, a predetermined calculation is performed to control various operations of the members of the interior air-conditioning unit 10.

An output side of the air-conditioning electronic control unit 70 is connected to the refrigerant switching valve 55, the hot water switching valve 66, the electrical motor 12b for driving the centrifugal fan 12a of the blower portion 12, the servomotor 71 for driving the first bypass door 18, the servomotor 72 for driving the second bypass door 22, the servomotor 73 for driving the air outlet mode door, the servomotor 74 for driving the inside/outside air switch door, and the electromagnetic clutch 51a of the compressor 51.

Detected signals of multiple sensors 75 and operation signals from the air conditioning control panel 76 are inputted to an input side of the air-conditioning electronic control unit 70. The multiple sensors 75 include an outside air temperature sensor for detecting a temperature of air (outside air) outside the vehicle, an inside air temperature sensor for detecting an inside air temperature in the passenger compartment, a solar radiation sensor for detecting a solar radiation amount irradiated to the passenger compartment, a hot water temperature sensor of the vehicle engine 61, and a heat exchanger temperature sensor for detecting a temperature of air blown from the cooling heat exchanger 15 and the cooling/heating switching heat exchanger 16.

The air conditioning control panel 76 is provided with an inner temperature set switch, an air amount switch of the blower 12, an inside/outside air mode switch of the inside/outside air switch door, and an air outlet mode switch of the air blowing-out mode door.

Next, operation of various control modes shown FIGS. 1-4 which are set by the air-conditioning electronic control unit 70 will be now described. Setting of the various control modes will be described later.

FIG. 1 shows a first maximum cooling mode where a maximum cooling operation is performed to have an air amount priority. In the first maximum cooling mode, the first bypass door 18 is operated by the driving servomotor 71 to the solid line position in FIG. 1 to fully open the first bypass passage 17. In this case, air from the blower 12 is guided by the first bypass door 18 to be introduced to both the first bypass passage 17 and the upstream side of the cooling heat exchanger 15 approximately by the same degree. Similarly, the second bypass door 22 is operated by the servomotor 72 to the solid line position in FIG. 1 to fully open the second bypass passage 19 and to fully close the communication passage 20.

Further, in the refrigerant cycle 50, while the electromagnetic clutch 51a is engaged to operate the compressor 51, the first outlet passage 55a of the refrigerant switching valve 55 is opened and the second outlet passage 55b of the refrigerant switching valve 55 is closed. Accordingly, the low-pressure refrigerant having passed the thermal expansion valve 54 firstly flows through the cooling/heating switching heat exchanger 16, and thereafter flows through the cooling heat exchanger 15.

In the hot water circuit 60, during the first maximum cooling mode, the hot water switching valve 66 is closed to prevent a circulation of the hot water in the water tubes 42 of the cooling/heating switching heat exchanger 16. In this case, air is cooled in the cooling/heating switching heat exchanger 16 due to an evaporation of the low-pressure refrigerant, and the cooling heat exchanger functions as a cooling heat exchanger.

Accordingly, in the first maximum cooling mode, both the cooling/heating switching heat exchanger 16 and the cooling heat exchanger 15 are operated to cool air. As compared with a comparison example where a single cooling heat exchanger is used to cool air, the size of the cooling heat exchanger can be half decreased according to this embodiment.

When the first maximum cooling mode is set as shown in FIG. 1, the air passes through the cooling/heating switching heat exchanger 16 after passing through the first bypass passage 17 as shown by the arrow 100 in FIG. 1. Moreover, the air having passed the cooling heat exchanger 15 flows through the second bypass passage 19 as shown by the arrow 101 in FIG. 1.

Accordingly, as compared with a case shown in FIG. 2 (described later) in which air passes through the heat exchangers 15 and 16 in series with respect to the air flowing direction in the air conditioning case 14, an air-flowing pressure loss in the air conditioning case 14 is effectively decreased in this first maximum cooling mode where air passes through the heat exchanger 15 and the heat exchangers 16 in parallel with respect to the air flowing direction in the air conditioning case 14. Accordingly, the amount of the air flowing into the passenger compartment is sufficiently increased. Thus, not only a front seat zone but also a rear seat zone, that is, the whole of the passenger compartment can be cooled rapidly. Furthermore, an air blowing noise can be reduced due to the decrease of the air-flowing pressure loss.

Next, a second maximum cooling mode where a maximum cooling operation is performed to have a low temperature priority will be now described with reference to FIG. 2. In the second maximum cooling mode, the first bypass door 18 is operated by the servomotor 71 to the solid line position to fully close the first bypass passage 17, so that all of the air blown by the blower 12 flows through the cooling heat exchanger 15.

Moreover, the second bypass door 22 is operated by the servomotor 72 to the solid line position to fully close the second bypass passage 19 and to fully open the communication passage 20. As a result, all of the air having passed the heat exchanger 15 flows through the cooling/heating switching heat exchanger 16. That is, in the second maximum cooling mode, all the air blown by the blower portion 12 flows through both the heat exchangers 15 and 16 in this order as shown by the arrow 103 in FIG. 2. In this case, the cooling/heating switching heat exchanger 16 is positioned on the downstream side of the cooling heat exchanger 15 in the air flowing direction.

During the second maximum cooling mode, the refrigerant cycle 50 and the hot water circuit 60 are controlled similarly to those of the first maximum cooling mode of FIG. 1. The cooling/heating switching heat exchanger 16 also functions as the cooling heat exchanger during the second maximum cooling mode.

As compared with the first maximum cooling mode shown in FIG. 1, the amount of the air blown into the passenger compartment is decreased due to an increase of the air-flowing pressure loss in this second maximum cooling mode. In contrast, the air cooled by the cooling heat exchanger 15 on the upstream side is cooled again by the cooling/heating switching heat exchanger 16 on the downstream side.

Accordingly, air blown into the passenger compartment can be cooled rapidly even if a heat load for cooling air is large immediately after a parking in a high environment temperature. Accordingly, a low temperature air can be directly blown to a front seat passenger to feel comfortable.

The second maximum cooing mode in FIG. 2 is set when there is no a rear seat passenger and temperature in the passenger compartment is equal to or larger than a predetermined value (e.g., 30° c.) at which the passenger will feel hot.

Next, a maximum heating mode shown in FIG. 3 will be now described. In this case, the first bypass door 18 and the second bypass door 19 are operated to the same positions as those shown in FIG. 2, so that all the blown air flows through the heat exchangers 15 and 16 orderly shown by the arrow 103. In the maximum heating mode, the cooling/heating switching heat exchanger 16 is switched to be operated as the heating heat exchanger.

During the maximum heating mode, the first outlet passage 55a of the refrigerant switching valve 55 is closed and the second outlet passage 55b of the refrigerant switching valve 55 is opened in the refrigerant cycle 50. Accordingly, the low-pressure refrigerant having passed the thermal expansion valve 54 directly flows into the cooling heat exchanger 15 through the refrigerant switching valve 55. Therefore, the refrigerant does not flow through the refrigerant tube 41 of the cooling/heating switching heat exchanger 16.

During the maximum heating mode, the hot water switching valve 66 in the hot water circuit 60 is opened, so that the hot water from the vehicle engine 61 is pumped by the water pump 62 to circulate in the hot water tube 42 of the cooling/heating switching heat exchanger 16. Thus, the hot water is used as a heat source to heat air flowing through the cooling/heating switching heat exchanger 16 which functions as the heating heat exchanger.

In this maximum heating mode, all the air having passed the cooling heat exchanger 15 is heated by the cooling/heating switching heat exchanger 16. As shown in FIG. 3, during the maximum heating mode, the first bypass passage 17 is fully closed by the first bypass door 18 and the second bypass 19 is fully closed by the second bypass door 22. As a result, all the air blown by the blower 12 flows through the cooling heat exchanger 15 to be cooled and dehumidified therein, and thereafter flows through the cooling/heating switching heat exchanger 16 to be heated therein. Thus, air blown into the passenger compartment can be sufficiently dehumidified and heated.

Next, a temperature control mode will be now described with reference to FIG. 4. In this case, the temperature of air to be blown into the passenger compartment is controlled to a target temperature in a predetermined middle temperature range. During the temperature control mode, the first bypass door 18 is operated to the solid line position to fully close the first bypass passage 17 as shown in FIG. 4. Thus, all the air blown by the blower 12 flows into the cooling heat exchanger 15 to be dehumidified.

Similarly to the maximum heating mode shown in FIG. 3, the cooling/heating switching heat exchanger 16 functions as the heating heat exchanger in this temperature control mode. In this case, all air blown by the blower 12 flows into the cooling heat exchanger 15. A part of the air having passed through the cooling heat exchanger 15 will be heated by the heat exchanger 16. An opening degree of the second bypass door 22 is changed to adjust a ratio between an air amount flowing from the cooling heat exchanger 15 into the cooling/heating switching heat exchanger 16 (shown by arrow 104) through the communication passage 20, and an air amount flowing from the cooling heat exchanger 15 into the second bypass passage 19 (shown by arrow 105) while bypassing the cooling/heating switching heat exchanger 16. Accordingly, the temperature of a mixed air to be blown into the passenger compartment can be controlled at the target air temperature in the predetermined temperature range.

In FIG. 4, when the second bypass door 22 is operated to the chain line position 106, the communication passage 20 is fully closed similarly to the above-described maximum cooling modes. When the second bypass door 22 is operated to the chain line position 107, the second bypass passage 19 is fully closed similarly to the above-described maximum heating mode.

In the temperature control mode, only the heat exchanger 15 functions as the cooling heat exchanger, and the heat exchanger 16 functions as the heating heat exchanger. However, a cooling capacity due to the cooling heat exchanger 15, which is about half of that due to both of the heat exchangers 15, 16, can satisfy the practical air conditioning requirement because the cooling capacity (dehumidification capacity) to be necessary in the temperature control mode or the maximum heating mode is sufficiently smaller than that to be necessary in the first or second maximum cooling mode.

In the second maximum cooling mode shown in FIG. 2, the low pressure refrigerant firstly flows through the cooling/heating switching heat exchanger 16 disposed at the downstream air side, and thereafter flows through the cooling heat exchanger 15 disposed at the upstream air side. Accordingly, in the heat exchangers 15 and 16, the flowing direction of the refrigerant is opposite to that of the air. Therefore, a temperature difference between the refrigerant and air can be increased, and heat exchanging efficiency can be effectively improved in both of the heat exchangers 15, 16.

Moreover, when the cooling/heating switching heat exchanger 16 is used as the heating heat exchanger, the hot water flows therein in a direction opposite to the air flowing direction. Therefore, a temperature difference between the air and the hot water in the whole hot water flowing area of the cooling/heating switching heat exchanger 16 can be increased, and heat exchanging efficiency can be effectively improved in the cooling/heating heat exchanger 16.

Next, control operation performed by the microcomputer of the air-conditioning electric control unit 70 will be described with reference to FIG. 8. In this embodiment, the microcomputer of the air-conditioning electric control unit 70 performs determining operation for determining an operation mode such as the first maximum cooling mode, the second maximum cooling mode, the maximum heating mode and the temperature control mode.

Figure 8:
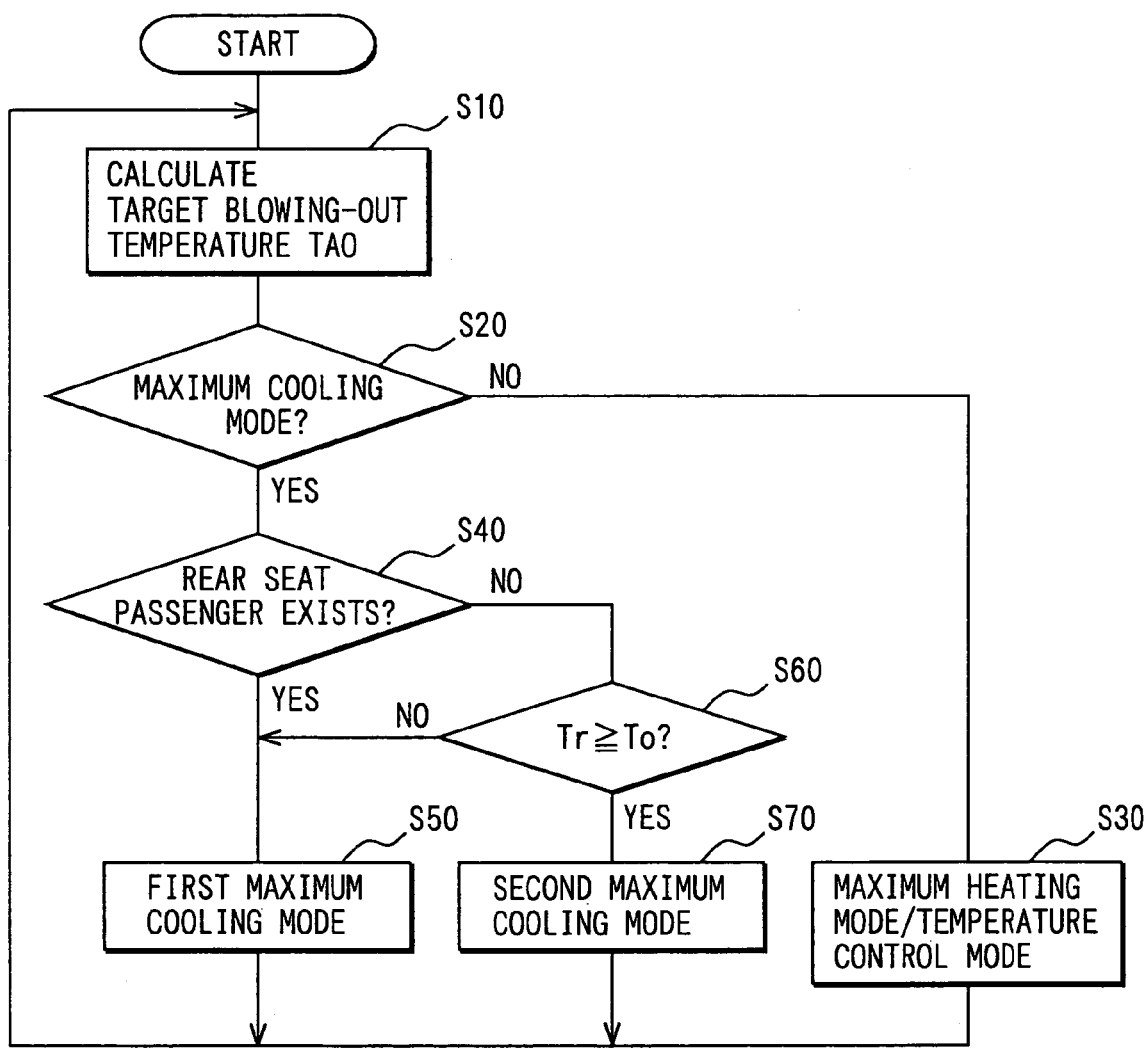
FIG. 8 is a flow diagram showing a control process of an air-conditioning electronic control unit (A/C ECU) according to the first embodiment.

At step S10 in FIG. 8, a target blowing-out temperature TAO of air to be blown into the passenger compartment is firstly calculated based on a set temperature Tset set by a passenger in the passenger compartment, an inside air temperature Tr, an outside air temperature Tam and a solar radiation amount Ts. As well known, the target blowing-out temperature TAO is a temperature necessary for maintaining the temperature Tset in the passenger compartment, regardless of a variation of the heat load of the vehicle.

At step S20, it is determined whether the maximum cooling mode is set or not. For example, when the target blowing-out temperature TAO is higher than the temperature of air blown from the cooling heat exchanger 15, it is determined that the operation mode is not the maximum cooling mode. Thus, NO is determined at step S20, and step S30 will be performed to set the temperature control mode or the maximum heating mode. In contrast, when the target blowing-out temperature TAO is lower than the temperature of the air blown from the cooling heat exchanger 15, it is determined that the maximum cooling mode is set. Thus, YES is determined at step S20, and step S40 will be performed to determine whether there is a passenger on the rear seat or not by using a seat switch (not shown) disposed on the rear seat or an infrared rays sensor (not shown).

At step S40, when it is determined that the rear seat passenger exists, the first maximum cooling mode is set at step S50. When the rear seat passenger does not exist, that is, there is only the front seat passenger, step S60 is performed.

At step S60, it is determined whether the inside air temperature Tr of the passenger compartment is equal to or larger than a predetermined temperature To or not. The predetermined temperature To is a predetermined value in which the passenger may feel hot, for example, 30° c. When it is determined that the inside air temperature Tr is equal to or higher than the predetermined temperature To at step S60, step S70 is performed. At step S70, the second maximum cooling mode is set. When the inside air temperature Tr is lower than the predetermined temperature To, step S50 is performed. At the step S50, the first maximum cooling mode is set even if there is only the front seat passenger. The above control operation shown in FIG. 8 is repeated by the air-conditioning electric control unit 70 after the interior air-conditioning unit 10 is started.

As described above, in this embodiment, when the first maximum cooling mode with an air amount priority is set, both of the heat exchangers 15 and 16 are used as the cooling heat exchanger to have a maximum cooling capacity while the air-flowing pressure loss is reduced. Therefore, the inside air temperature Tr of the passenger compartment can be set to be equal to or lower than the set temperature Tset in a shorter time. Moreover, the air blowing noise can be reduced due to the decrease of the air-flowing pressure loss. In contrast, when there is no rear seat passenger and the inside air temperature Tr of the passenger compartment is higher than the predetermined temperature To, the second maximum cooling mode is set so that air having a low temperature is blown to the passenger on the front seat.

Second Embodiment

In the above-described first embodiment, when the temperature control mode shown in FIG. 4 is set, the first bypass door 18 is operated to the solid line position to fully close the first bypass passage 17, and the rotation position (i.e., opening degree) of the second bypass door 22 is changed so that the temperature of the air blown into the passenger compartment is controlled to a target temperature in the predetermined temperature range.

Figure 9:
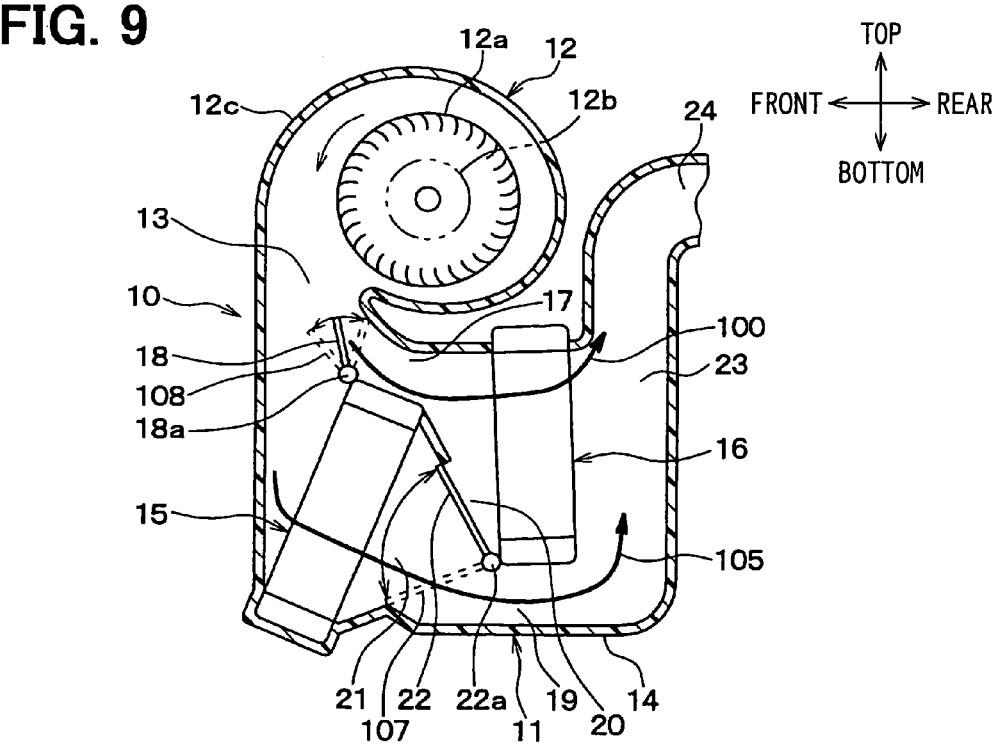
FIG. 9 is a schematic sectional view showing an interior air-conditioning unit for a vehicle air conditioner according to a second embodiment of the present invention.

In the second embodiment, as shown in FIG. 9, when the temperature control state is set, the second bypass door 22 is operated to the solid line position to fully close the communication passage 20, and the rotation position (opening degree) of the first bypass door 18 is changed so that the temperature of air blown into the passenger compartment is controlled.

According to the second embodiment, a part of air blown by the blower 10 bypasses the cooling heat exchanger 15 to flow through the first bypass passage 17 (shown by arrow 100). In this case, the air blown by the blower is not dehumidified. At the same time, the other part of air blown by the blower 10 flows through the cooling heat exchanger 15 and is introduced into the second bypass passage 19 which is fully opened as shown by arrow 105. In this case, because air passes through the heat exchangers 15, 16 in parallel with respect to the air flowing direction, the air-flowing pressure loss during the temperature control mode can be decreased. Therefore, the air blowing noise in the temperature control mode can be decreased.

However, because the second bypass passage 19 cannot be fully closed by only using the first bypass door 18, the maximum heating mode or a high temperature area of the predetermined temperature range cannot be set. In the second embodiment, for setting the maximum heating mode, the first bypass door 18 is operated to the chain line position 108 to fully open the first bypass passage 17, and the second bypass door 22 is operated to the chain line position 107 to fully close the second bypass passage 19. Accordingly, all of the blown air of the blower 10 flows through the cooling/heating heat exchanger 16 to be heated therein, so that the maximum heating mode can be set. Moreover, the high temperature area of the predetermined temperature range can be set when the second bypass door 22 is operated to a position near the chain line position 107 at which the second bypass passage 19 is fully closed. In the second embodiment, the other parts are similar to those of the above-described first embodiment.

Other Embodiment

Although the present invention has been fully described in connection with the preferred embodiments thereof with reference to the accompanying drawings, it is to be noted that various changes and modifications will become apparent to those skilled in the art.

For example, in the above-described first embodiment, when the first maximum cooling mode is set as shown in FIG. 1, the second bypass door 22 is arranged to the solid line position to fully close the communication passage 20. However, during the first maximum cooling mode with the air amount priority, the second bypass door 22 can be also operated to partly open the communication passage 20 while a passage area of the second bypass passage 19 is not largely reduced.

In the above-described first embodiment, the first maximum cooling mode with the air amount priority and the second maximum cooling mode with the low temperature priority operation are automatically switched by the air-conditioning electronic control unit 70. However, additional first and second maximum cooling mode operating switches, which are manually selected by the passenger, can be provided to set the first or second maximum cooling mode in which the air amount or the low temperature is made prior.

In the above-described first embodiment, the low temperature refrigerant (low temperature medium) on the low pressure side of the refrigerant cycle 50 or the hot water (high temperature medium) of the hot water circuit 60 is selectively introduced to the cooling/heating heat exchanger 16, so that the cooling/heating heat exchanger 16 functions as the cooling heat exchanger or the heating heat exchanger. However, the structure of the cooling/heating heat exchanger 16 of the present invention is not limited to that, and can be changed.

For example, a cool water circuit (e.g., brine circuit) can be provided, in which water is cooled by the low temperature refrigerant on the low pressure side of the refrigerant cycle 50. The cool water (e.g., brine) of the cool water circuit and the hot water (i.e., high temperature medium) of the hot water circuit 60 are switched to be selectively introduced into the cooling/heating heat exchanger 16. In this case, it is unnecessary to construct two kinds of fluid passages including the refrigerant tube 41 and the water tube 42. That is, one kind of the fluid passage is sufficient in the cooling/heating heat exchanger 16, in which any one of the cool water from the cool water circuit and the hot water from the hot water circuit 60 flows. Accordingly, the structure of the cooling/heating heat exchanger 16 can be simplified as compared with the structure of the first embodiment.

Moreover, the low temperature refrigerant (low temperature medium) on the low pressure side of the refrigerant cycle 50 and a high temperature refrigerant (high temperature medium) on the high pressure side of the refrigerant cycle 50 can be also switched to be selectively introduced into the cooling/heating heat exchanger 16, so that the cooling/heating heat exchanger 16 can be used as the cooing heat exchanger or the heating heat exchanger. In this case, the cooling/heating heat exchanger 16 can be provided with the cooling function and the heating function only using the refrigerant cycle 50 without using the hot water circuit 60.

In the above-described first embodiment, because the interior air-conditioning unit 10 (i.e., case 14) is arranged inside a dashboard which is disposed at the front part of the passenger compartment, the conditioned air from the air blowing-out opening portion 24 of the case 14 is mainly blown to the front seat passenger. However, a rear seat air blowing-out opening portion can be also provided in the case 14 of the interior air-conditioning unit 10, and is connected with a rear seat connecting duct so that the conditioned air is blown to the rear seat passenger of the passenger compartment.

In the above-described first embodiment, the cooling/heating heat exchanger 16 is used as the second heat exchanger disposed at the downstream air side in the case 14. If the vehicle is used in a tropical zone so that the heating function is not needed, a heat exchanger having only the cooling function can be also disposed at the downstream air side of the first heat exchanger as the second heat exchanger in the case 14. In this case, the second heat exchanger cools air only in the maximum cooling mode and around the maximum cooling mode. In the temperature control mode, the second heat exchanger dose not cool air, and is used only as an air passage.

Such changes and modifications are to be understood as being within the scope of the present invention as defined by the appended claims.

What is claimed is:

1. An air conditioner in combination with a vehicle having a passenger compartment, the air conditioner comprising:
    an air conditioning case in which air flows toward the passenger compartment;
    a first heat exchanger for cooling air, the first heat exchanger being disposed in the air conditioning case to define a first bypass passage through which air flows while bypassing the first heat exchanger, at one side of the first heat exchanger in the air conditioning case;
    a first switching member for opening and closing the first bypass passage;
    a second heat exchanger disposed at a downstream air side of the first heat exchanger in the air conditioning case to define a second bypass passage through which air flows in the air conditioning case while bypassing the second heat exchanger at the other end side relative to the first heat exchanger, the second heat exchanger being switched to have a cooling function for cooling air or a heating function for heating air;
    a second switching member for opening and closing the second bypass passage;
    means for calculating a target temperature that is a temperature necessary for maintaining a set temperature set by a passenger in the passenger compartment;
    maximum cooling determining means for determining whether a control state of air to be blown into the passenger compartment is a maximum cooling state, based on the target temperature;
    rear passenger determining means for determining whether a passenger exists on a rear seat in the passenger compartment;
    means for setting a first maximum cooling mode in which a maximum cooling operation is performed with a priority for an air flow amount, when the maximum cooling determining means determines the maximum cooling state and when the rear passenger determining means determines that a passenger exists on the rear seat in the passenger compartment; and
    means for setting a second maximum cooling mode in which a maximum cooling operation is performed with a priority for an air temperature, when the rear passenger determining means determines that no passenger exists on the rear seat in the passenger compartment and an inside temperature of the passenger compartment is higher than a predetermined temperature.

2. The combination according to claim 1, further comprising:
    the means for setting a first maximum cooling mode in which a maximum cooling operation is performed to have an air amount priority causes air to flow through the first and second heat exchangers in parallel; wherein
    in the first maximum cooling mode, the setting means switches the second heat exchanger to have the cooling function for cooling air, the first switching member to open the first bypass passage, and the second switching member to open the second bypass passage.

3. The combination according to claim 1, further comprising:
    the means for setting a second maximum cooling mode in which a maximum cooling operation is performed to have an air temperature priority causes air to flow through the first and second heat exchangers in series; wherein
    in the second maximum cooling mode, the setting means switches the second heat exchanger to have the cooling function for cooling air, the first switching member to close the first bypass passage, and the second switching member to close the second bypass passage.

4. The air conditioner combination according to claim 1, further comprising:
    means for setting a maximum heating mode for heating the passenger compartment in maximum, the setting means switching the second heat exchanger to have the heating function for heating air, wherein, in the maximum heating mode the setting means switches the second switching member to close the second bypass passage.

5. The combination according to claim 1, wherein:
    the first heat exchanger and the second heat exchanger communicate with each other through a communication passage;
    when the first switching member fully opens the first bypass passage, air flows through both the first heat exchanger and the first bypass passage by a predetermined ratio; and
    when the second switching member fully opens the second bypass passage, the communication passage is closed by the second switching member.

6. The combination according to claim 1, further comprising:
    means for setting a temperature control mode where a temperature of air to be blown into the passenger compartment is adjusted, the setting means switching the second heat exchanger to have the heating function for heating air, wherein, in the temperature control mode the setting means switches the second switching member to adjust a ratio between an air amount flowing through the second bypass passage and an air amount flowing through the second heat exchanger to control the temperature of air blown into the passenger compartment.

7. The combination according to claim 1, further comprising:
    means for setting a temperature control mode where a temperature of air to be blown into the passenger compartment is adjusted, the setting means switching the second heat exchanger to have the heating function for heating air, wherein, in the temperature control mode, the setting means switches the second switching member to close the communication passage, and the first switching member to adjust a ratio between an air amount flowing through the first bypass passage and an air amount flowing through the first heat exchanger to control the temperature of air blown into the passenger compartment.

8. The air conditioner combination according to claim 1, further comprising:

means for introducing a low temperature medium from a low temperature medium circuit into the second heat exchanger; and means for introducing a high temperature medium from a high temperature medium circuit into the second heat exchanger.

9. The combination according to claim 2, wherein:

the air conditioning case is disposed at a front portion in the passenger compartment to blow air to a front seat portion in the passenger compartment.

10. An air conditioner in combination with a vehicle having a passenger compartment, the air conditioner comprising:

an air conditioning case in which air flows toward the passenger compartment;

a first heat exchanger disposed at an upstream air side in the air conditioning case for cooling air;

a second heat exchanger having at least a cooling function, the second heat exchanger being disposed at a downstream air side of the first heat exchanger in the air conditioning case; and air flow switching means disposed in the air conditioning case for switching an air flow in each of the first and the second heat exchangers;

means for setting a first maximum cooling mode where a maximum cooling operation is performed to have an air amount priority is set, the second heat exchanger has the cooling function, the air flow switching means switches the air flows of the first and the second heat exchangers such that air flows through the first and the second heat exchangers in parallel; and means for calculating a target temperature that is a temperature necessary for maintaining a set temperature set by a passenger in the passenger compartment;

maximum cooling determining means for determining whether a control state of air to be blown into the passenger compartment is a maximum cooling state, based on the target temperature;

rear passenger determining means for determining whether a passenger exists on a rear seat in the passenger compartment;

the means for setting sets a first maximum cooling mode in which a maximum cooling operation is performed with a priority for an air flow amount, when the maximum cooling determining means determines the maximum cooling state and when the rear passenger determining means determines that a passenger exists on the rear seat in the passenger compartment; and means for setting a second maximum cooling mode in which a maximum cooling operation is performed with a priority for low air temperature, when the rear passenger determining means determines that no passenger exists on the rear seat in the passenger compartment and an inside temperature of the passenger compartment is higher than a predetermined temperature; wherein the second heat exchanger is a cooling/heating switching heat exchanger constructed to be switched between the cooling function for cooling air and a heating function for heating air.

11. The combination according to claim 10, further comprising:

when the means for setting a second maximum cooling mode where a maximum cooling operation is performed to have a low temperature priority is set, the second heat exchanger has the cooling function, the air flow switching means switches the air flows of the first and the second heat exchangers such that air flows through the first and the second heat exchangers in series.

12. The combination according to claim 11, wherein: the air flow switching means includes a first bypass passage through which air flows while bypassing the first heat exchanger, the first bypass passage being provided at one side of the first heat exchanger in the air conditioning case, a first switching member for opening and closing the first bypass passage, a second bypass passage through which air flows while bypassing the second heat exchanger, the second bypass passage being provided in the air conditioning case at one side of the second heat exchanger opposite to the first bypass passage with respect to the first heat exchanger, and a second switching member for opening and closing the second bypass passage;

when the means for setting the first maximum cooling mode is set, the first switching member opens the first bypass passage and the second switching member opens the second passage; and when the means for setting the second maximum cooling mode is set, the first switching member closes the first bypass passage and the second switching member closes the second bypass passage.

13. The combination according to claim 10, further comprising:

means for introducing a low temperature medium from a low temperature medium circuit into the second heat exchanger; and means for introducing a high temperature medium from a high temperature medium circuit into the second heat exchanger.

14. The combination according to claim 10, wherein:

the air conditioning case is disposed at a front portion in the passenger compartment to blow air to a front seat portion in the passenger compartment.

15. The combination according to claim 11, further comprising:

the rear passenger determining means including a first determining unit for determining whether there is a rear seat passenger in the passenger compartment; and a second determining unit for determining whether a temperature in the passenger compartment is equal to or higher than a predetermined value, wherein:

the air conditioning case is disposed at a front portion in the passenger compartment to blow air to a front seat portion in the passenger compartment;

when the first determining unit determines that the rear seat passenger does not exist and the second determining unit determines that the temperature in the passenger compartment is equal to or higher than the predetermined value, the second maximum cooling mode is set by the means for setting a second maximum cooling mode; and when the first determining unit determines that the rear seat passenger does not exist and the second determining unit determines that the temperature in the passenger compartment of the vehicle is lower than the predetermined value, the first maximum cooling mode is set by the means for setting a first maximum cooling mode.

* * * * *